United States Patent
Sarkis et al.

(10) Patent No.: US 11,570,646 B2
(45) Date of Patent: Jan. 31, 2023

(54) REDUCED MONITORING STATE

(71) Applicant: QUALCOMM Incorporated, San Diego, CA (US)

(72) Inventors: Gabi Sarkis, San Diego, CA (US); Peter Pui Lok Ang, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/786,540

(22) Filed: Feb. 10, 2020

(65) Prior Publication Data
US 2020/0260309 A1    Aug. 13, 2020

Related U.S. Application Data

(60) Provisional application No. 62/804,611, filed on Feb. 12, 2019.

(51) Int. Cl.
*H04W 24/10*   (2009.01)
*H04W 48/12*   (2009.01)
(Continued)

(52) U.S. Cl.
CPC .......... *H04W 24/10* (2013.01); *H04L 5/0051* (2013.01); *H04L 5/0092* (2013.01);
(Continued)

(58) Field of Classification Search
CPC .................................................. H04W 24/10
See application file for complete search history.

(56) References Cited

U.S. PATENT DOCUMENTS

| 8,630,674 B2 * | 1/2014 | Rosay ................... | H04W 24/10 455/526 |
| 2018/0098358 A1 * | 4/2018 | Rico Alvarino ...... | H04L 5/0092 |

(Continued)

OTHER PUBLICATIONS

Gemalto., N.V., "Relaxed monitoring for NB-IoT", 3GPP Draft, R2-1710151, 3rd Generationpartnership Project (3GPP), Mobilecompetence Centre ; 650, Route Deslucioles ; F-06921 Sophia-Antipolis Cedex; France, vol. Ran WG2, No. Prague, Czech Republic; Oct. 9, 2017-Oct. 13, 2017, Sep. 28, 2017 (Sep. 28, 2017), XP051354230, 5 pages, Retrieved from the Internet: URL: http://www.3gpp.org/ftp/tsg_ran/WG2_RL2/TSGR2_99bis/Docs/. [retrieved on Sep. 28, 2017] 1 Introduction, 2 Discussion, 3 Conclusion.

(Continued)

*Primary Examiner* — Jason E Mattis
(74) *Attorney, Agent, or Firm* — Qualcomm Incorporated

(57) ABSTRACT

Various aspects of the present disclosure generally relate to wireless communication. In some aspects, a user equipment or a base station may determine that a condition for entering a reduced monitoring state is satisfied, wherein the reduced monitoring state uses at least one of: a diminished radio frequency chain configuration, a diminished channel monitoring configuration, a restriction on receiving or transmitting a shared channel or a control channel, or a combination thereof; and communicate using the reduced monitoring state. Numerous other aspects are provided.

30 Claims, 5 Drawing Sheets

(51) Int. Cl.
| | |
|---|---|
| H04L 5/00 | (2006.01) |
| H04W 8/24 | (2009.01) |
| H04W 16/14 | (2009.01) |
| H04L 27/26 | (2006.01) |
| H04W 72/04 | (2009.01) |

(52) U.S. Cl.
CPC .......... *H04L 27/2607* (2013.01); *H04W 8/24* (2013.01); *H04W 16/14* (2013.01); *H04W 48/12* (2013.01); *H04W 72/042* (2013.01)

(56) References Cited

U.S. PATENT DOCUMENTS

| | | | |
|---|---|---|---|
| 2019/0090261 A1* | 3/2019 | Yang | H04L 1/1664 |
| 2019/0132862 A1* | 5/2019 | Jeon | H04L 5/0064 |
| 2019/0191457 A1* | 6/2019 | Si | H04W 48/12 |
| 2019/0313332 A1* | 10/2019 | Wu | H04W 52/0225 |
| 2019/0335427 A1* | 10/2019 | Sun | H04B 7/0626 |
| 2019/0363832 A1* | 11/2019 | Yang | H04L 1/18 |
| 2020/0092073 A1* | 3/2020 | Papasakellariou | H04L 27/26025 |
| 2020/0107279 A1* | 4/2020 | Sun | H04W 52/346 |
| 2020/0195410 A1* | 6/2020 | Li | H04W 76/28 |
| 2021/0099902 A1* | 4/2021 | Takeda | H04L 5/0057 |

OTHER PUBLICATIONS

International Search Report and Written Opinion—PCT/US2020/017676—ISA/EPO—dated May 26, 2020.
Samsung: "Triggering Adaptation Schemes", 3GPP Draft, 3GPP TSG RAN WG1 Meeting #95, R1-1813012 Triggering Adaptation Schemes, 3rd Generation Partnership Project (3GPP), Mobile Competence Centre, 650, Route Des Lucioles, F-06921 Sophia-Antipolis Cedex, France, vol. RAN WG1. No. Spokane, USA, Nov. 12, 2018-Nov. 16, 2018, Nov. 11, 2018 (Nov. 11, 2018), XP051554990, 9 Pages, Retrieved from the Internet: URL: http://www.3gpp.org/ftp/Meetings%5F3GPP%5FSYNC/RAN1/Docs/R1%2D1813012%2Ezip, [retrieved on Nov. 11, 2018], the whole document.
Vivo: "NR UE Power Saving", 3GPP Draft, R1-1806091, NR UE Power Saving, 3rd Generation Partnership Project (3GPP), Mobile Competence Centre, 650, Route Des Lucioles, F-06921 Sophia-Antipolis Cedex, France, vol. Ran WG2, No. Busan, Korea, May 21, 2018-May 25, 2018, May 12, 2018 (May 12, 2018), XP051462355, 5 pages, Retrieved from the internet: URL:http://www.3gpp.org/ftp/tsg%5Fran/WG1% 5FRL1/TSGR1%5F93/Docs. [retrieved on May 12, 2018] Introduction background 2 Solutions for NR UE power saving.
"3rd Generation Partnership Project, Technical Specification Group Radio Access Network, NR, Study on UE Power Saving (Release 16)", 3GPP Draft, R1-1814387, TR 38 840 Update Rani 95 Track Change, 3rd Generation Partnership Project (3GPP), Mobile Competence Centre, 650, Route Des Lucioles, F-06921 Sophia-Antipolis Cedex, France, Nov. 29, 2018 (Nov. 29, 2018), XP051494843, 24 pages, Retrieved from the Internet: URL: http://www.3gpp.org/ftp/tsg%5Fran/WG1%5FRL1/TSGR1%5F95/Docs/R1%2D1814387%2Ezip. [retrieved on Nov. 29, 2018] 4 Introduction 5 UE power saving schemes 8.1 UE power consumption model.
Ericcson: "Adaptation Aspects of NR UeE PowerSaving", 3GPP Draft, R1-1811501, Adaptation Aspects of NR UE PowerSaving, 3rd Generation Partnership Project (3GPP), Mobile Competence Centre, 650, Route Des Lucioles, F-06921 Sophia-Antipolis Cedex, France, vol. Ran WG2, No. Chengdu, China, Oct. 8, 2018-Oct. 12, 2018, Sep. 29, 2018 (Sep. 29, 2018), XP051518904, 4 pages, Retrieved from the internet: URL: http://www.3gpp.org/ftp/tsg%5Fran/WG1 %5FRL1/TSGR1 %5F94b/Docs/R1%2D1811501%2Ezip. [retrieved on Sep. 29, 2018], 1. Intriduction, 2. WUS/GTS based techniques, 3 Power saving techniques for use of BWP and CA 4 Power saving techniques for MIMO 5 UE assistance information for power efficient techniques Conclusion.

\* cited by examiner

REDUCED MONITORING STATE

CROSS-REFERENCE TO RELATED APPLICATION

This patent application claims priority to Provisional Patent Application No. 62/804,611, filed on Feb. 12, 2019, entitled "REDUCED MONITORING STATE," and assigned to the assignee hereof. The disclosure of the prior application is considered part of and is incorporated by reference in this patent application.

FIELD OF THE DISCLOSURE

Aspects of the present disclosure generally relate to wireless communication, and more particularly to techniques and apparatuses for a reduced monitoring state.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that a condition for entering a reduced monitoring state is satisfied, wherein the reduced monitoring state uses at least one of a diminished radio frequency (RF) chain configuration, a diminished channel monitoring configuration, a restriction on receiving or transmitting a shared channel or a control channel, or a combination thereof; and communicating using the reduced monitoring state.

In some aspects, a UE for wireless communication may include memory and one or more processors operatively coupled to the memory. The memory and the one or more processors may be configured to determine that a condition for entering a reduced monitoring state is satisfied, wherein the reduced monitoring state uses at least one of a diminished RF chain configuration, a diminished channel monitoring configuration, a restriction on receiving or transmitting a shared channel or a control channel, or a combination thereof; and communicate using the reduced monitoring state.

In some aspects, a non-transitory computer-readable medium may store one or more instructions for wireless communication. The one or more instructions, when executed by one or more processors of a UE, may cause the one or more processors to determine that a condition for entering a reduced monitoring state is satisfied, wherein the reduced monitoring state uses at least one of a diminished RF chain configuration, a diminished channel monitoring configuration, a restriction on receiving or transmitting a shared channel or a control channel, or a combination thereof; and communicate using the reduced monitoring state.

In some aspects, an apparatus for wireless communication may include means for determining that a condition for entering a reduced monitoring state is satisfied, wherein the reduced monitoring state uses at least one of: a diminished RF chain configuration, a diminished channel monitoring configuration, a restriction on receiving or transmitting a shared channel or a control channel, or a combination thereof; and means for communicating using the reduced monitoring state.

In some aspects, a method of wireless communication, performed by a base station, may include determining that a condition for a reduced monitoring state of a UE is satisfied, wherein the reduced monitoring state uses at least one of: a diminished RF chain configuration of the UE, a diminished channel monitoring configuration for the UE, a restriction on receiving or transmitting a shared channel or a control channel for the UE, or a combination thereof; and communicating with the UE based at least in part on the reduced monitoring state.

In some aspects, a base station for wireless communication may include memory and one or more processors operatively coupled to the memory. The memory and the one or more processors may be configured to determine that a condition for a reduced monitoring state of a UE is satisfied, wherein the reduced monitoring state uses at least one of: a diminished RF chain configuration of the UE, a diminished channel monitoring configuration for the UE, a restriction on receiving or transmitting a shared channel or a control channel for the UE, or a combination thereof; and communicate with the UE based at least in part on the reduced monitoring state.

In some aspects, a non-transitory computer-readable medium may store one or more instructions for wireless communication. The one or more instructions, when executed by one or more processors of a base station, may cause the one or more processors to determine that a condition for a reduced monitoring state of a UE is satisfied, wherein the reduced monitoring state uses at least one of: a diminished RF chain configuration of the UE, a diminished channel monitoring configuration for the UE, a restriction on receiving or transmitting a shared channel or a control channel for the UE, or a combination thereof; and communicate with the UE based at least in part on the reduced monitoring state.

In some aspects, an apparatus for wireless communication may include means for determining that a condition for a reduced monitoring state of a UE is satisfied, wherein the reduced monitoring state uses at least one of: a diminished RF chain configuration of the UE, a diminished channel monitoring configuration for the UE, a restriction on receiving or transmitting a shared channel or a control channel for the UE, or a combination thereof; and means for communicating with the UE based at least in part on the reduced monitoring state.

Aspects generally include a method, apparatus, system, computer program product, non-transitory computer-readable medium, user equipment, base station, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
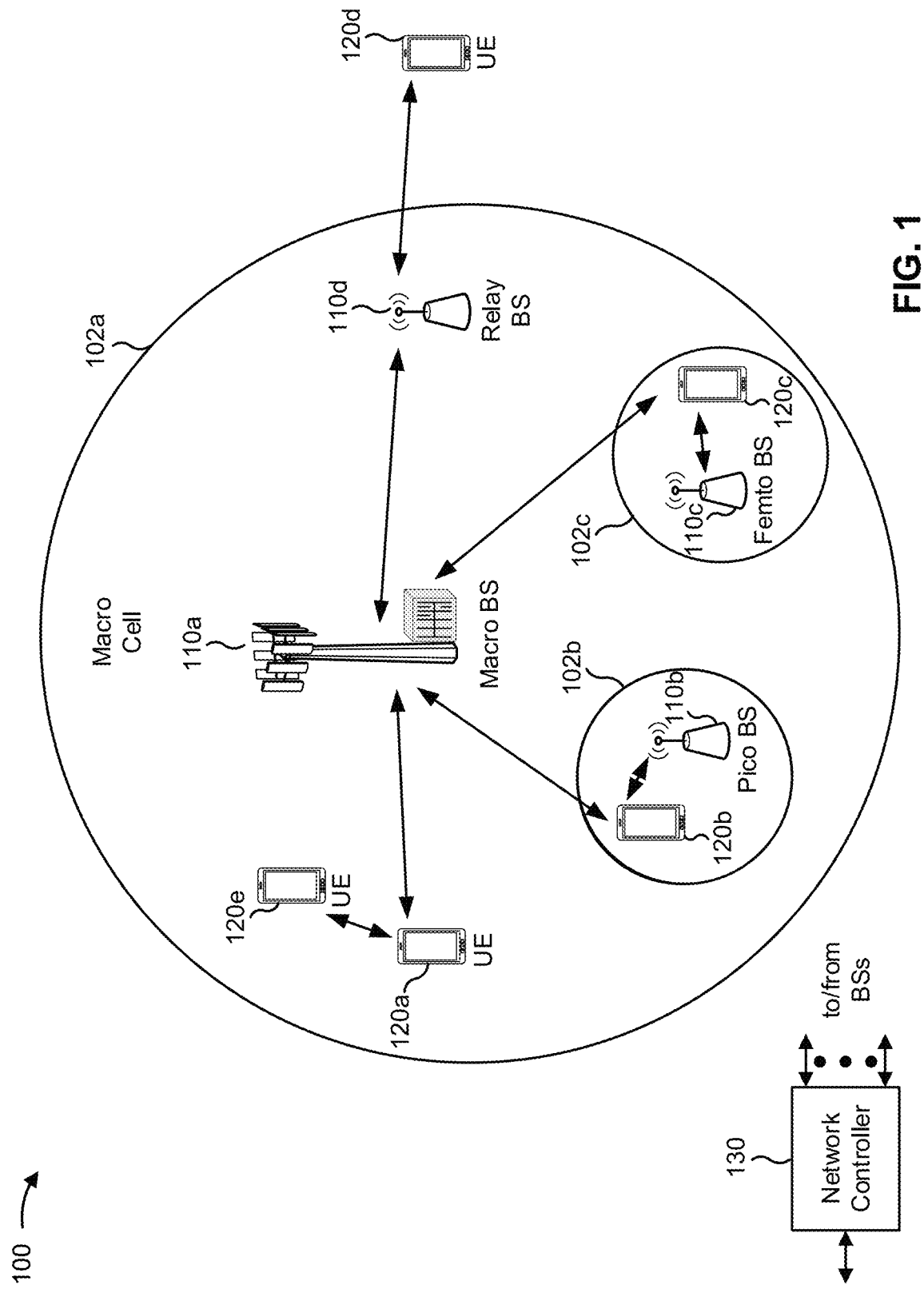
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
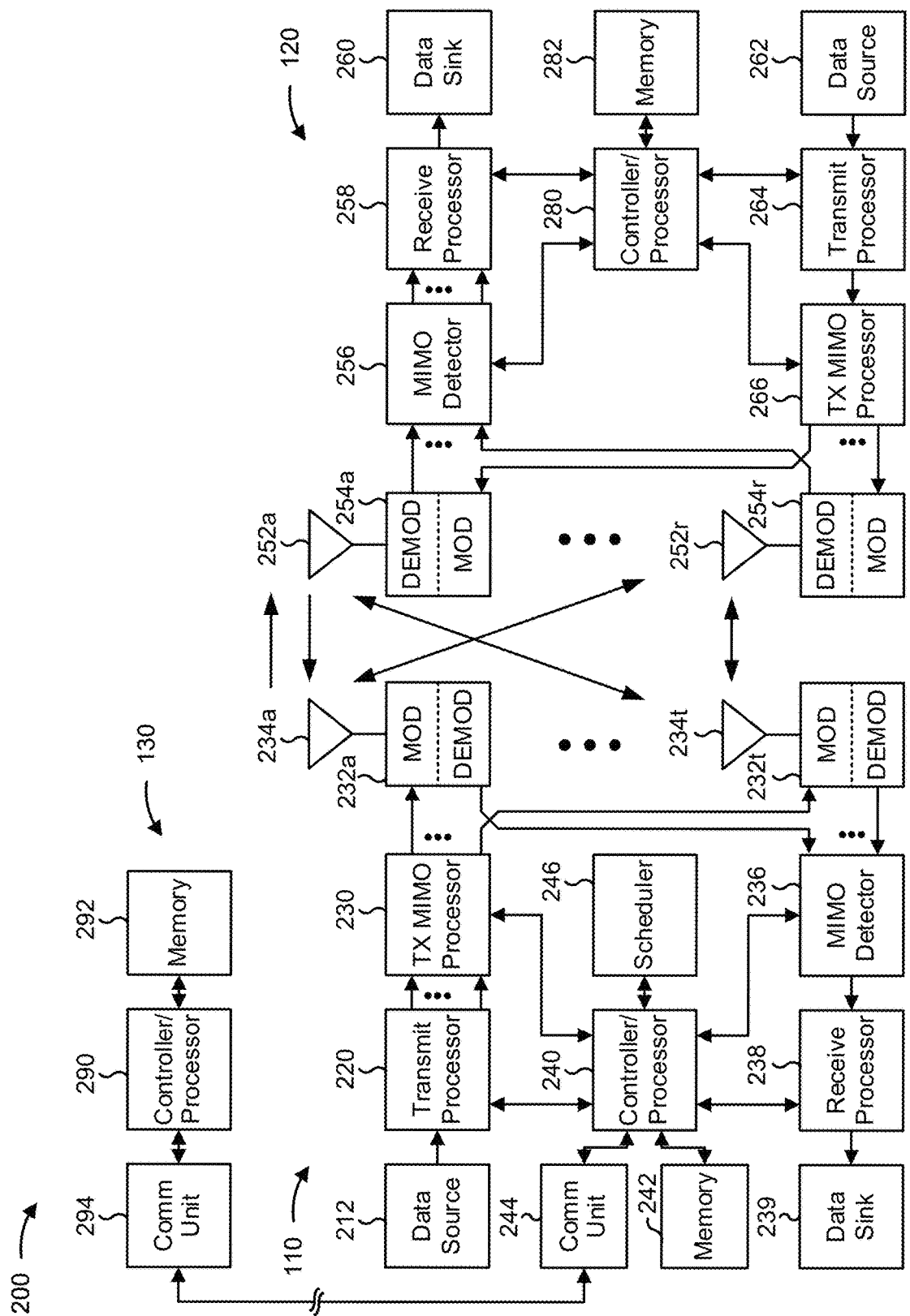
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a reduced monitoring state, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memories 242 and 282 may be operatively coupled with controller/processor 240 and controller/processor 280, respectively. A scheduler 246 may schedule UEs for data transmission on the downlink and/or uplink.

In some aspects, UE 120 may include means for determining that a condition for entering a reduced monitoring state is satisfied, wherein the reduced monitoring state uses at least one of: a diminished RF chain configuration, a diminished channel monitoring configuration, a restriction on receiving or transmitting a shared channel or a control channel, or a combination thereof; means for communicating using the reduced monitoring state; means for switching to the particular bandwidth part; means for leaving the reduced monitoring state based at least in part on a bandwidth part switch signal; means for performing a bandwidth part switch with a reduced bandwidth part switching delay; means for providing information indicating a minimum supported timing offset, wherein the information indicating the minimum supported timing offset is provided as a UE capability or using a UE-assistance framework; and/or the like. In some aspects, such means may include one or more components of UE 120 described in connection with FIG. 2, such as controller/processor 280 and/or the like.

In some aspects, base station 110 may include means for determining that a condition for a reduced monitoring state of a UE is satisfied, wherein the reduced monitoring state uses at least one of: a diminished RF chain configuration of the UE, a diminished channel monitoring configuration for the UE, a restriction on receiving or transmitting a shared channel or a control channel, or a combination thereof for the UE; means for communicating with the UE based at least in part on the reduced monitoring state; means for transmitting a message to cause the UE to switch to the particular bandwidth part; means for transmitting a bandwidth part switch signal to cause the UE to leave the reduced monitoring state; means for transmitting downlink control information indicating that the UE is to enter or leave the reduced monitoring state, wherein the downlink control information triggers the condition; means for receiving information indicating a minimum supported timing offset of the UE, wherein the information indicating the minimum supported timing offset comprises a UE capability or using a UE-assistance framework; and/or the like. In some aspects, such means may include one or more components of base station 110 described in connection with FIG. 2, such as controller/processor 240 and/or the like.

As indicated above, FIG. 2 is provided as an example. Other examples may differ from what is described with regard to FIG. 2.

A UE may perform various operations on a cell. These operations may include, for example, monitoring a control channel (e.g., a physical downlink control channel (PDCCH) and/or the like) for scheduling information (e.g., physical downlink shared channel (PDSCH) scheduling information or physical uplink shared channel (PUSCH) scheduling information) or an indication of a slot format;

receiving a PDSCH; transmitting a PUSCH and/or a physical uplink control channel (PUCCH); performing a measurement (e.g., a channel state information (CSI) measurement, a synchronization signal block (SSB) measurement, and/or the like); and/or the like. In some radio access technologies (e.g., 5G/NR), the UE may be expected to have 4 receive antennas (e.g., corresponding to 4 RF chains) when operating in certain bands. Furthermore, when cross carrier scheduling is enabled, the UE may monitor grants on a primary cell and not a secondary cell of the UE. Performing this monitoring while remaining ready to receive a PDSCH may consume significant power for the UE, particularly on bands in which the UE is expected to use 4 receive antennas.

Some techniques and apparatuses described herein provide a reduced monitoring state for the UE which may reduce power consumption of the UE. For example, the reduced monitoring state may be configured for one or more of: a diminished RF chain configuration; a diminished channel monitoring configuration; or a restriction on receiving or transmitting a shared channel or a control channel. Using a diminished RF chain configuration may permit the powering down or powering off of one or more RF chains and/or antennas of the UE, thereby conserving power. Furthermore, the diminished channel monitoring configuration may restrict the set of channels or reference signals that the UE is expected to monitor or transmit, thereby conserving power of the UE. Still further, the restriction on transmitting or receiving the shared channel or the control channel may reduce battery and/or processor usage in connection with receiving a PDSCH or transmitting a PUSCH, or transmitting an SRS, in comparison to a baseline performance, as described in more detail elsewhere herein. The reduced monitoring state may be based at least in part on a condition that may be satisfied by the usage of a reduced monitoring bandwidth part (BWP) or an explicit signal that the reduced monitoring state is to be used. In this way, battery usage of the UE is reduced.

Figure 3:
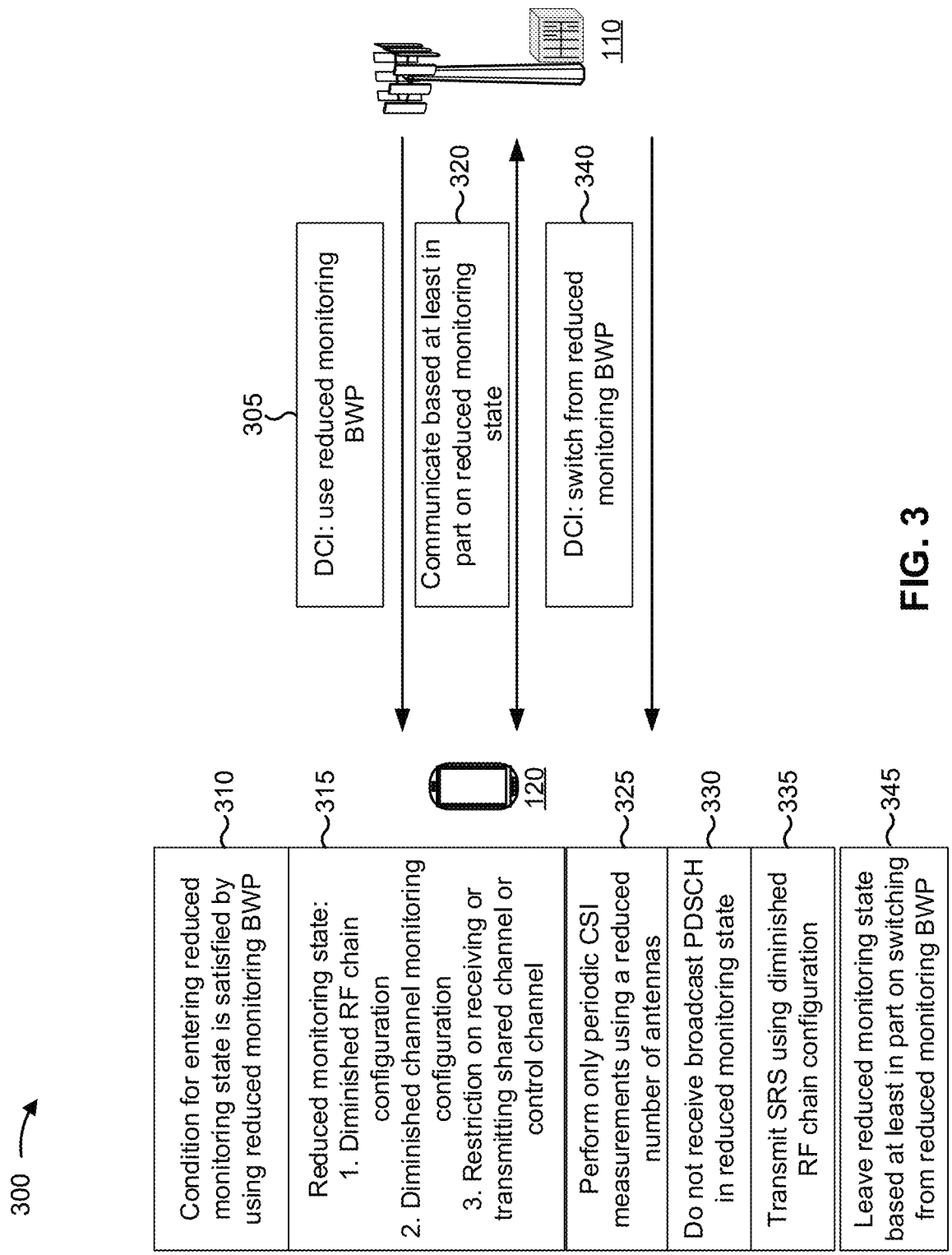
FIG. 3 is a diagram illustrating an example of communication using a reduced monitoring state, in accordance with various aspects of the present disclosure.

FIG. 3 is a diagram illustrating an example 300 of communication in a reduced monitoring state, in accordance with various aspects of the present disclosure. As shown, example 300 includes a UE (e.g., UE 120) and a BS (e.g., BS 110).

As shown in FIG. 3, and by reference number 305, the BS may provide an indication to use a particular BWP, shown here as a reduced monitoring BWP. Here, the indication is downlink control information (DCI). In this case, the reduced monitoring BWP is associated with a reduced monitoring state of the UE 120. As shown by reference number 310, the UE 120 may determine that a condition for using the reduced monitoring state is satisfied when the UE 120 uses the reduced monitoring BWP. As more particular examples, the UE 120 may determine that the condition for using the reduced monitoring state is satisfied when the UE 120 is configured to use the reduced monitoring BWP, when the UE 120 is switched to the reduced monitoring BWP by the BS 110, when the UE 120 initializes on the reduced monitoring BWP, and/or the like. Triggering the reduced monitoring state based at least in part on initializing on the reduced monitoring BWP may conserve signaling resources that would otherwise be used to provide an indication that the UE 120 is to enter the reduced monitoring state, and may cause an initial state of the UE 120 to be the relaxed monitoring state. Triggering the reduced monitoring state based at least in part on the UE 120 being switched to the reduced monitoring BWP may provide increased flexibility for configuration of UEs 120 to use the reduced monitoring state.

In some aspects, the BS 110 may provide an explicit indication that the UE 120 is to use the reduced monitoring state. For example, the BS 110 may provide information (e.g., DCI) that indicates that the UE 120 is to enter or leave the reduced monitoring state. In some aspects, this information may be associated with activating or deactivating the reduced monitoring BWP. As another example, the BS 110 may provide a group DCI message that indicates that multiple UEs 120 are to enter or leave the reduced monitoring state.

As shown by reference number 315, the reduced monitoring state may be associated with any one or more of a diminished RF chain configuration, a diminished channel monitoring configuration, or a restriction on receiving and/or transmitting a shared channel or a control channel. A diminished RF chain configuration may use a diminished number of RF chains, a diminished number of antennas (e.g., receive antennas or transmit antennas) and/or a diminished transmit power relative to a baseline RF chain configuration. A diminished channel monitoring configuration may identify particular occasions and/or situations in which the UE 120 does not need to perform channel monitoring or feedback. A restriction on receiving and/or transmitting a shared channel or control channel may identify particular types of channels or particular occasions of channels that do not need to be received or expected to be received by the UE. More particular examples are provided below.

As shown by reference number 320, the UE 120 and the BS 110 may communicate with each other based at least in part on the reduced monitoring state. As mentioned, particular examples of the operations performed by the UE in connection with the reduced monitoring state are provided in connection with reference numbers 325, 330, and 335, below.

As shown by reference number 325, in some aspects, the UE 120 may perform only periodic CSI measurements based at least in part on the reduced monitoring state (e.g., based at least in part on the diminished channel monitoring configuration and/or the diminished RF chain configuration). Furthermore, in some aspects, the UE 120 may perform CSI measurements using a reduced number of antennas (e.g., based at least in part on the diminished RF chain configuration). As one example, the UE 120 may perform only periodic CSI measurements (e.g., and not aperiodic CSI measurements) when in the reduced monitoring state. "Periodic CSI measurement" may refer to a radio resource control (RRC)-configured CSI measurement, whereas "aperiodic CSI measurement" may refer to a DCI-triggered CSI measurement. In some aspects, the UE 120 may be configured to perform periodic and aperiodic CSI measurements in the reduced monitoring state.

In some aspects, the UE 120 may perform CSI measurements using a reduced number of antennas. For example, the UE 120 may perform periodic CSI measurements using four receive antennas, and may perform aperiodic CSI measurements using two receive antennas. In some aspects, the UE 120 may use a different number of receive antennas for periodic CSI measurements and/or aperiodic CSI measurements than four and two antennas, respectively (e.g., two receive antennas for both, four receive antennas for both, and/or the like). In some aspects, the UE 120 may transmit CSI feedback based at least in part on the reduced monitoring state. For example, the UE 120 may transmit CSI feedback using a reduced number of transmit antennas and/or using a reduced transmit power in the reduced monitoring state.

As shown by reference number 330, in some aspects, the UE 120 may not receive (e.g., monitor for, decode, demodulate, and/or the like) a broadcast signal (e.g., a broadcast PDSCH, a paging message, a system information block (SIB), and/or the like) in the reduced monitoring state. For example, the restriction on receiving or transmitting the shared channel or the control channel may indicate that the UE 120 is not to receive or is not expected to receive the broadcast channel in the reduced monitoring state. In some aspects, the restriction on receiving or transmitting the shared channel or the control channel may indicate that the UE 120 is to (e.g., is configured to, is expected to, and/or the like) receive a broadcast PDSCH and/or that the UE 120 is not to receive a unicast PDSCH in the reduced monitoring state.

In some aspects, the restriction on receiving or transmitting the shared channel or the control channel may indicate that the UE 120 is to use a subset of possible modulation and coding scheme (MCS) indices for a transmission or reception. For example, the restriction on receiving or transmitting the shared channel or the control channel may indicate that the UE 120 is to use a limited subset of MCS indices for transmitting a PUSCH or receiving a PDSCH, thereby conserving battery power that would otherwise be used for modulation or demodulation using a higher-complexity MCS index. In some aspects, the diminished RF chain configuration may indicate that the UE 120 is to use a proper subset of antennas to receive or transmit a shared channel or a control channel. Additionally, or alternatively, the diminished RF chain configuration may indicate that the UE 120 is to monitor only for a PDCCH and is not expected to receive a PDSCH or transmit a PUSCH, thereby further conserving battery of the UE 120.

In some aspects, the reduced monitoring state may indicate that a broadcast signal (e.g., a broadcast PDSCH and/or the like) for a UE in a reduced monitoring state is to be cross-slot scheduled (e.g., is guaranteed to be cross-slot scheduled). Cross-slot scheduling refers to a case wherein scheduling information, received in a first slot, is used to schedule a transmission in a subsequent slot. A gap between the first slot and the subsequent slot may be defined by a value referred to as K0. In this case, K0 may be predefined (e.g., in a wireless communication standard), configured (e.g., radio resource control configured), indicated in a system information block (SIB), and/or the like. By cross-slot scheduling the broadcast signal, power usage of the UE 120 that would otherwise be used to perform an intra-slot reception of the broadcast signal may be conserved.

As shown by reference number 335, in some aspects, the UE 120 may transmit a sounding reference signal (SRS) using the diminished RF chain configuration. For example, the UE 120 may transmit an SRS using a diminished number of transmit antennas, which may conserve power of the UE 120 relative to transmitting the SRS using all transmit antennas of the UE 120. In some aspects, the UE 120 may transmit the SRS using all transmit antennas of the UE 120, which may improve monitoring performance of the BS 110. In some aspects, the UE 120 may not be expected to transmit the SRS in the reduced-monitoring state, which may conserve power of the UE 120 relative to transmitting the SRS.

As shown by reference number 340, the UE 120 may receive, from the BS 110, DCI. For example, the DCI may be a BWP switch signal indicating that the UE 120 is to switch from or deactivate the reduced monitoring BWP. Accordingly, as shown by reference number 345, the UE 120 may leave the reduced monitoring state based at least in part on switching from the reduced monitoring BWP. For example, the UE 120 may determine that the condition is no longer satisfied, and may accordingly leave the reduced monitoring state. In such a case, the UE 120 may use a timing offset relative to a baseline configuration, which may be advantageous so that the UE can more readily receive a PDSCH or a PUSCH after switching the BWP. For example, the UE 120 may provide information indicating a minimum supported timing offset, and the BS 110 may select a timing offset based at least in part on the minimum supported timing offset. In some aspects, the UE 120 may provide information indicating the minimum supported timing offset using a UE capability indication, a UE-assistance framework, and/or the like.

In some aspects, the UE 120 may perform one or more actions based at least in part on leaving the reduced monitoring state. For example, the UE 120 may activate one or more RF chains of the UE 120, activate one or more antennas of the UE 120, transmit SRS using all antennas of the UE 120, monitor all CSI occasions, monitor one or more CSI occasions using all antennas of the UE 120, and/or the like.

In some aspects, the DCI may include a grant (e.g., a PDSCH grant or a PUSCH grant). For example, the grant may be for a subsequent PDSCH or a PUSCH to be transmitted or received by the UE 120 after leaving the reduced monitoring state. In such a case, the UE 120 may leave the reduced monitoring state and may receive the PDSCH or transmit the PUSCH. In some aspects, the UE 120 may receive the PDSCH or transmit the PUSCH based at least in part on the reduced BWP switching delay described above.

As indicated above, FIG. 3 is provided as an example. Other examples may differ from what is described with respect to FIG. 3.

Figure 4:
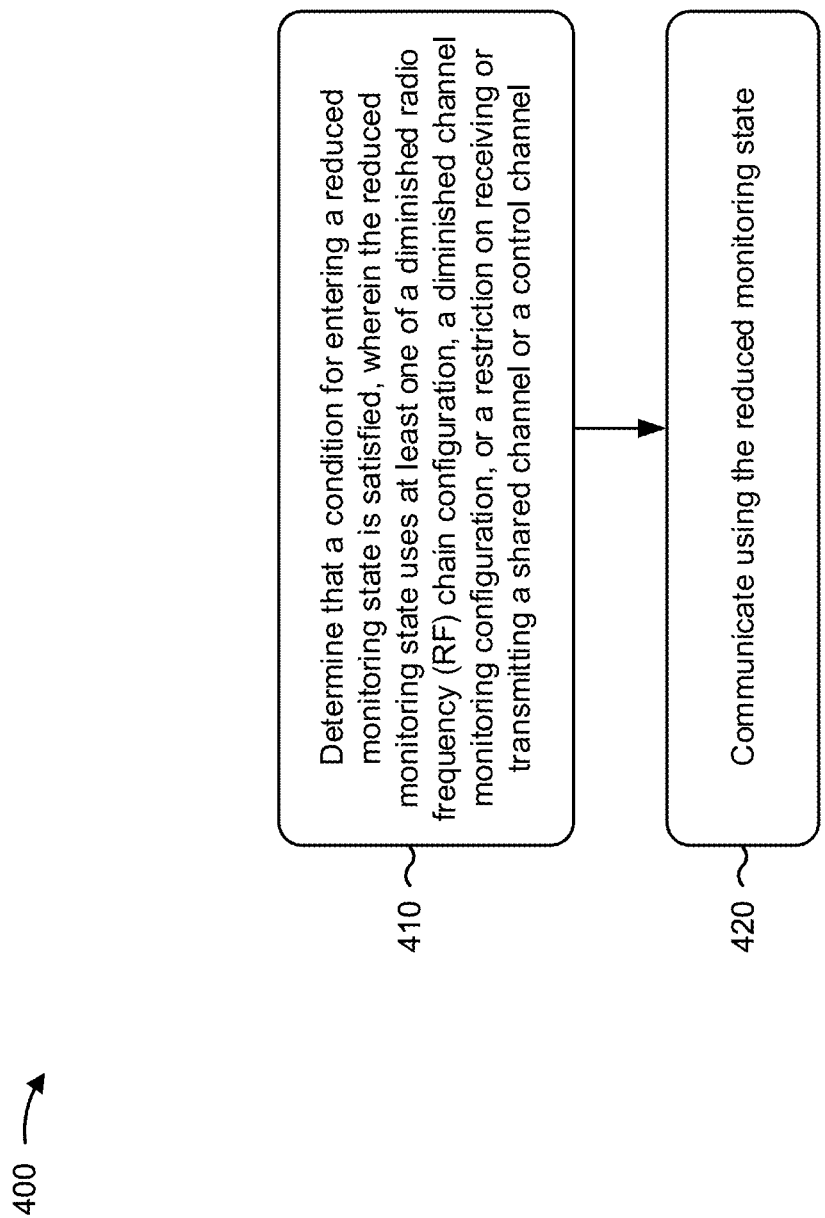
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120) performs communication based at least in part on a reduced monitoring state.

As shown in FIG. 4, in some aspects, process 400 may include determining that a condition for entering a reduced monitoring state is satisfied, wherein the reduced monitoring state uses at least one of a diminished RF chain configuration, a diminished channel monitoring configuration, a restriction on receiving or transmitting a shared channel or a control channel, or a combination thereof (block 410). For example, the UE (e.g., using controller/processor 280 and/or the like) may determine that a condition for entering a reduced monitoring state is satisfied. The reduced monitoring state may use at least one of a diminished RF chain configuration, a diminished channel monitoring configuration, a restriction on receiving or transmitting a shared channel or a control channel, or a combination thereof.

As shown in FIG. 4, in some aspects, process 400 may include communicating using the reduced monitoring state (block 420). For example, the UE (e.g., using controller/processor 280, transmit processor 264, TX MIMO processor 266, MOD 254, antenna 252, DEMOD 254, MIMO detector 256, receive processor 258, and/or the like) may communicate using the reduced monitoring state. In some aspects, the UE may communicate with a base station based at least in part on the diminished RF chain configuration, the diminished channel monitoring configuration, or the restriction on receiving or transmitting the shared channel or the control channel.

Process 400 may include additional aspects, such as any single aspect and/or any combination of aspects described below and/or in connection with one or more other processes described elsewhere herein.

In a first aspect, the reduced monitoring state is associated with a particular bandwidth part, and the condition is satisfied when the UE uses the particular bandwidth part. In a second aspect, alone or in combination with the first aspect, the UE initializes on the particular bandwidth part. In a third aspect, alone or in combination with one or more of the first and second aspects, the UE may switch to the particular bandwidth part. In a fourth aspect, alone or in combination with one or more of the first through third aspects, the UE may leave the reduced monitoring state based at least in part on a bandwidth part switch signal. In a fifth aspect, alone or in combination with one or more of the first through fourth aspects, the UE may perform a bandwidth part switch with a reduced bandwidth part switching delay.

In a sixth aspect, alone or in combination with one or more of the first through fifth aspects, the condition is triggered by downlink control information indicating that the UE is to enter or leave the reduced monitoring state. In a seventh aspect, alone or in combination with one or more of the first through sixth aspects, the downlink control information comprises group downlink control information. In an eighth aspect, alone or in combination with one or more of the first through seventh aspects, the downlink control information schedules a transmission, and the transmission is performed after a timing offset. In a ninth aspect, alone or in combination with one or more of the first through eighth aspects, the timing offset is predefined or radio resource control configured. In a tenth aspect, alone or in combination with one or more of the first through ninth aspects, the UE may provide information indicating a minimum supported timing offset, wherein the information indicating the minimum supported timing offset is provided as a UE capability or using a UE-assistance framework. In an eleventh aspect, alone or in combination with one or more of the first through tenth aspects, the diminished channel monitoring configuration configures the UE to perform only periodic channel state information measurement and reporting.

In a twelfth aspect, alone or in combination with one or more of the first through eleventh aspects, the diminished RF chain configuration uses a proper subset of RF chains of the UE to perform a channel state information measurement. In a thirteenth aspect, alone or in combination with one or more of the first through twelfth aspects, the diminished RF chain configuration uses a proper subset of RF chains of the UE or a diminished transmit power to transmit channel state information feedback. In a fourteenth aspect, alone or in combination with one or more of the first through thirteenth aspects, the restriction on receiving or transmitting the control channel or the shared channel indicates that the UE is not to receive a broadcast transmission in the reduced monitoring state. In a fifteenth aspect, alone or in combination with one or more of the first through fourteenth aspects, the restriction on receiving or transmitting the shared channel or the control channel indicates that the UE is not to receive a unicast shared channel in the reduced monitoring state. In a sixteenth aspect, alone or in combination with one or more of the first through fifteenth aspects, the restriction on receiving or transmitting the shared channel or the control channel indicates that the shared channel is to be cross-slot scheduled. In a seventeenth aspect, alone or in combination with one or more of the first through sixteenth aspects, the diminished RF chain configuration uses a proper subset of RF chains of the UE or a diminished transmit power to transmit a sounding reference signal. In an eighteenth aspect, alone or in combination with one or more of the first through seventeenth aspects, the UE is to transmit a sounding reference signal using all RF chains in the reduced monitoring state. In a nineteenth aspect, alone or in combination with one or more of the first through eighteenth aspects, the UE is configured not to transmit a sounding reference signal in the reduced monitoring state.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
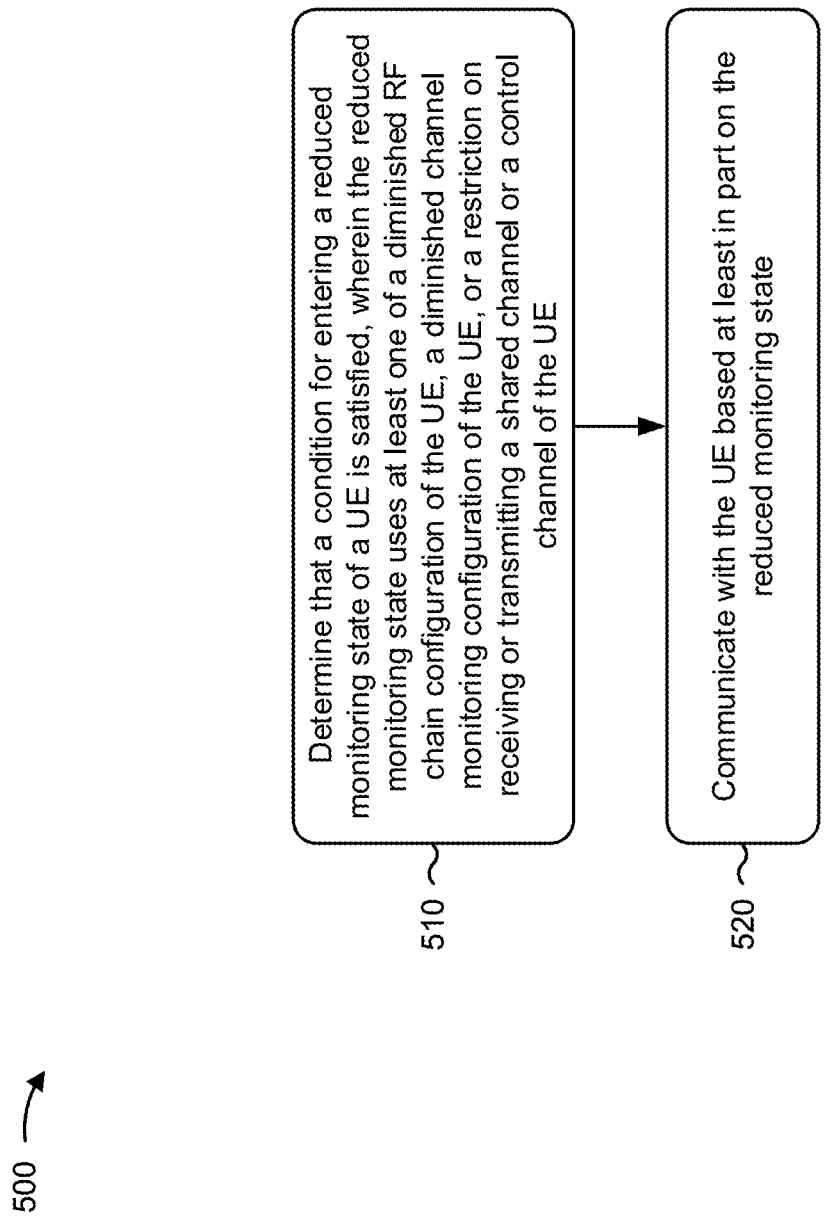
FIG. 5 is a diagram illustrating an example process performed, for example, by a base station, in accordance with various aspects of the present disclosure.

FIG. 5 is a diagram illustrating an example process 500 performed, for example, by a base station, in accordance with various aspects of the present disclosure. Example process 500 is an example where a base station (e.g., BS 110) performs communication based at least in part on a reduced monitoring state.

As shown in FIG. 5, in some aspects, process 500 may include determining that a condition for entering a reduced monitoring state of a UE is satisfied, wherein the reduced monitoring state uses at least one of a diminished RF chain configuration of the UE, a diminished channel monitoring configuration of the UE, a restriction on receiving or transmitting a shared channel or a control channel of the UE, or a combination thereof (block 510). For example, the base station (e.g., using controller/processor 240 and/or the like) may determine that a condition for entering a reduced monitoring state of a UE is satisfied. The reduced monitoring state may use at least one of a diminished RF chain configuration of the UE, a diminished channel monitoring configuration of the UE, a restriction on receiving or transmitting a shared channel or a control channel of the UE, or a combination thereof. In some aspects, the base station may cause the condition to be satisfied, as described in more detail elsewhere herein.

As shown in FIG. 5, in some aspects, process 500 may include communicating with the UE based at least in part on the reduced monitoring state (block 520). For example, the base station (e.g., using controller/processor 240, transmit processor 220, TX MIMO processor 230, MOD 232, antenna 234, DEMOD 232, MIMO detector 236, receive processor 238, and/or the like) may communicate with the UE. In some aspects, the base station may communicate with the UE based at least in part on the diminished RF chain configuration, the diminished channel monitoring configuration, or the restriction on receiving or transmitting the shared channel or the control channel.

Process 500 may include additional aspects, such as any single aspect and/or any combination of aspects described below and/or in connection with one or more other processes described elsewhere herein.

In a first aspect, the reduced monitoring state is associated with a particular bandwidth part, and the condition is satisfied when the UE uses the particular bandwidth part. In a second aspect, alone or in combination with the first aspect, the base station may transmit a message to cause the UE to switch to the particular bandwidth part. In a third aspect, alone or in combination with one or more of the first and second aspects, the base station may transmit a bandwidth part switch signal to cause the UE to leave the reduced monitoring state. In a fourth aspect, alone or in combination with one or more of the first through third aspects, the base station may transmit downlink control information indicating that the UE is to enter or leave the reduced monitoring state, wherein the downlink control information triggers the condition. In a fifth aspect, alone or in combination with one or more of the first through fourth aspects, the downlink control information comprises group downlink control information. In a sixth aspect, alone or in combination with one or more of the first through fifth aspects, the downlink control information schedules a transmission, and the transmission is performed after a timing offset. In a seventh aspect, alone or in combination with one or more of the first through sixth aspects, the timing offset is specified or radio resource control configured. In an eighth aspect, alone or in combination with one or more of the first through seventh aspects, the base station may receive information indicating a minimum supported timing offset of the UE, wherein the information indicating the minimum supported timing offset comprises a UE capability or using a UE-assistance framework. In a ninth aspect, alone or in combination with one or more of the first through eighth aspects, the restriction on receiving or transmitting the shared channel or the control channel indicates that the shared channel is to be cross-slot scheduled.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining that a condition for entering a reduced monitoring state is satisfied, wherein the reduced monitoring state uses at least one of:
        a restriction on receiving a control channel,
        a restriction on transmitting a shared channel, or
        a combination thereof;
    communicating using the reduced monitoring state; and
    leaving the reduced monitoring state based at least in part on using a timing offset relative to a baseline configuration.

2. The method of claim 1, wherein the reduced monitoring state is associated with a particular bandwidth part, and wherein the condition is satisfied when the UE uses the particular bandwidth part.

3. The method of claim 2, wherein the UE initializes on the particular bandwidth part.

4. The method of claim 2, further comprising:
    switching to the particular bandwidth part.

5. The method of claim 1, wherein leaving the reduced monitoring state is further based at least in part on a bandwidth part switch signal.

6. The method of claim 5, further comprising:
    performing a bandwidth part switch with a reduced bandwidth part switching delay.

7. The method of claim 1, wherein the condition is triggered by downlink control information indicating that the UE is to enter the reduced monitoring state.

8. The method of claim 7, wherein the downlink control information comprises group downlink control information.

9. The method of claim 7, wherein the downlink control information schedules a transmission, and wherein the transmission is performed after the timing offset.

10. The method of claim 9, wherein the timing offset is predefined or radio resource control configured.

11. The method of claim 1, further comprising:
    providing information indicating a minimum supported timing offset, wherein the information indicating the minimum supported timing offset is provided as a UE capability or using a UE-assistance framework.

12. The method of claim 1, wherein the reduced monitoring state further uses a diminished channel monitoring configuration that configures the UE to perform only periodic channel state information measurement and reporting.

13. The method of claim 1, wherein at least one of the restriction on receiving the control channel or the restriction on transmitting the shared channel indicates that the shared channel is to be cross-slot scheduled.

14. The method of claim 1, wherein the reduced monitoring state further uses a diminished radio frequency (RF) chain configuration that uses a proper subset of RF chains of the UE or a diminished transmit power to transmit a sounding reference signal.

15. The method of claim 1, wherein the UE is to transmit a sounding reference signal using all radio frequency (RF) chains in the reduced monitoring state.

16. The method of claim 1, wherein the UE is configured not to transmit a sounding reference signal in the reduced monitoring state.

17. A method of wireless communication performed by a network node, comprising:
   determining that a condition for a reduced monitoring state of a user equipment (UE) is satisfied, wherein the reduced monitoring state uses at least one of:
      a restriction on receiving a control channel for the UE,
      a restriction on transmitting a shared channel for the UE, or
      a combination thereof; and
   communicating with the UE based at least in part on the UE leaving the reduced monitoring state and using a timing offset relative to a baseline configuration.

18. The method of claim 17, wherein the reduced monitoring state is associated with a particular bandwidth part, and wherein the condition is satisfied when the UE uses the particular bandwidth part.

19. The method of claim 18, further comprising:
   transmitting a message to cause the UE to switch to the particular bandwidth part.

20. The method of claim 18, further comprising:
   transmitting a bandwidth part switch signal to cause the UE to leave the reduced monitoring state.

21. The method of claim 17, further comprising:
   transmitting downlink control information indicating that the UE is to enter or leave the reduced monitoring state, wherein the downlink control information triggers the condition.

22. The method of claim 17, wherein at least one of the restriction on receiving the control channel or the restriction on transmitting the shared channel indicates that the shared channel is to be cross-slot scheduled.

23. A user equipment (UE) for wireless communication, comprising:
   a memory; and
   one or more processors coupled to the memory, the one or more processors configured to:
      determine that a condition for entering a reduced monitoring state is satisfied, wherein the reduced monitoring state uses at least one of:
         a restriction on receiving a control channel,
         a restriction on transmitting a shared channel, or
         a combination thereof;
      communicate using the reduced monitoring state; and
      leave the reduced monitoring state based at least in part on using a timing offset relative to a baseline configuration.

24. The UE of claim 23, wherein the reduced monitoring state is associated with a particular bandwidth part, and wherein the condition is satisfied when the UE uses the particular bandwidth part.

25. The UE of claim 24, wherein the UE initializes on the particular bandwidth part.

26. The UE of claim 24, wherein the one or more processors are further configured to:
   switch to the particular bandwidth part.

27. The UE of claim 23, wherein the condition is triggered by downlink control information indicating that the UE is to enter the reduced monitoring state.

28. The UE of claim 23, wherein the reduced monitoring state further uses a diminished channel monitoring configuration that configures the UE to perform only periodic channel state information measurement and reporting.

29. A network node for wireless communication, comprising:
   a memory; and
   one or more processors coupled to the memory, the one or more processors configured to:
      determine that a condition for a reduced monitoring state of a user equipment (UE) is satisfied, wherein the reduced monitoring state uses at least one of:
         a restriction on receiving a control channel,
         a restriction on transmitting a shared channel, or
         a combination thereof; and
      communicate with the UE based at least in part on the UE leaving the reduced monitoring state and using a timing offset relative to a baseline configuration.

30. The network node of claim 29, wherein the reduced monitoring state is associated with a particular bandwidth part, and wherein the condition is satisfied when the UE uses the particular bandwidth part.

* * * * *